United States Patent [19]
Fischer et al.

[11] Patent Number: 5,504,305
[45] Date of Patent: Apr. 2, 1996

[54] TEMPERATURE CONTROL DEVICE FOR SOLDERING AND UNSOLDERING EQUIPMENT

[75] Inventors: Thomas Fischer, Bietigheim-Bissingen; Volker Munz, Kirchheim, both of Germany

[73] Assignee: Cooper Industries, Inc., Houston, Tex.

[21] Appl. No.: 74,851

[22] PCT Filed: Nov. 6, 1991

[86] PCT No.: PCT/EP91/02094

§ 371 Date: Aug. 16, 1993

§ 102(e) Date: Aug. 16, 1993

[87] PCT Pub. No.: WO92/10324

PCT Pub. Date: Jun. 25, 1992

[30] Foreign Application Priority Data

Dec. 13, 1990 [DE] Germany .................... 40 39 844.7

[51] Int. Cl.[6] .................................................. H05B 1/02
[52] U.S. Cl. ................... 219/497; 219/501; 219/506; 219/85.1; 219/240; 228/51
[58] Field of Search .................... 219/494, 240, 219/497, 506, 501, 483–486, 86.1, 85.22, 229, 236, 85.1; 228/9, 102, 180.21, 230, 228, 51

[56] References Cited

U.S. PATENT DOCUMENTS

| | | | |
|---|---|---|---|
| 3,789,190 | 1/1974 | Orosy et al. | 219/497 |
| 4,461,951 | 7/1984 | Luoma, II et al. | 219/497 |
| 4,771,929 | 9/1988 | Bahr et al. | 228/102 |
| 4,933,535 | 6/1990 | Zabinsky | 219/497 |
| 4,960,975 | 10/1990 | Weinbrecht | 219/241 |
| 5,023,430 | 6/1991 | Brekkestran et al. | 219/486 |
| 5,345,061 | 9/1994 | Chanasyk et al. | 219/388 |

*Primary Examiner*—Mark H. Paschall
*Attorney, Agent, or Firm*—Conley, Rose & Tayon

[57] ABSTRACT

In a temperature regulator for soldering and unsoldering equipment having a heating device fed by a controllable electric source of heating current, the heating output of which is transmitted to a spot to be soldered by a heating output transmission device, a signal that is proportional to the temperature of the heating device is generated and compared in a comparator of a control circuit to a set value. The control circuit derives from the output signal of the comparator a control signal for controlling the source of heating current. In addition, a temperature sensor (5) is arranged in the area adjacent to the spot to be soldered of the heating output transmission device (3), the output signal of which is compared in another comparator (23) of another control circuit (23, 27, 28) to another set value (7). The second control circuit supplies another control signal for controlling the source (11) of heating current. The control signals from the first control circuit (13, 17, 18) are supplied to the first input and the control signal from the second control circuit (23, 27, 28) are supplied to the second input of an AND logical element (20), the output signal of which only switches on the controllable source (11) of heating current when both control circuits simultaneously supply output signals for temperatures lying below the respective set values.

34 Claims, 2 Drawing Sheets

1

TEMPERATURE CONTROL DEVICE FOR SOLDERING AND UNSOLDERING EQUIPMENT

BACKGROUND OF THE INVENTION

The invention relates to a temperature control device for soldering equipment.

From EP 0,048,772 a temperature control device for a hot gas soldering and unsoldering device is known in which the gas, such as air, is directed from a gas source through an elongated heat coil which heats the gas and guides it via a nozzle to the object to be heated, such as a soldering spot, at a temperature corresponding to the desired application. At that time, the gas flowing through the heat coils forms a heat output transmission device from the heat coil to the soldering spot. With this hot gas device, the heat coil has a positive temperature coefficient and it is fed by a controllable heating current source, the current of which is periodically interrupted. During the interruption of the heating current, a measuring current is directed from a measuring current source through the heat coils, wherein the voltage drop along the heat coil is a function of the resistance and thus of the temperature of this heat coil. This voltage drop is compared with a control value and is used via a control circuit for the control of the controllable heating current source. This type of temperature control is relatively inertia-free and precise due to the low heating capacity of the heat coil and it is possible, during operational pauses, to interrupt the gas flow through the heat coils without interrupting the heating current as well, since the heating coil, due to the temperature control device, is always maintained at the temperature predetermined by the control value without the danger of a burnout of the heat coil. Furthermore, the heat coil, during renewed feeding of the gas flow, is at its operating temperature so that the gas flow is immediately heated to the desired temperature. Since the gas forming the heat output transmission device is directed to the soldering spot, however, changes in the temperature of the hot gas may occur during passage through the nozzle, particularly in the case of certain cross sections and forms of the nozzle. These temperature changes cannot be determined by taking temperature measurements along the heat coil and may lead to changes in the exit temperature of the hot gas from the nozzle.

Furthermore, from EP-0,202,401, a soldering or unsoldering device is known in which the heat output transmission device is formed by a soldering point and the heating arrangement includes a heat coil with a negligible temperature coefficient and a temperature sensor which is serially connected with this heat coil and is in the form of an additional heat coil section with a measurable temperature coefficient. Also here, during a periodic interruption of the heating current, the voltage drop occurring along the combination of the heat coil and the temperature sensor, is measured, compared with a control value and is used via a control circuit for controlling a controllable heating source which feeds the named combination. When the soldering tip, forming the heat output transmission device, is relatively long or has a relatively high heat resistance, then the temperature measurement taking place in the area of the heating device permits no clear information regarding the temperature present at the active end of the soldering tip that comes into contact with the soldering spot, i.e., particularly not when, at this end, a very large heat loss occurs.

In order to improve the precision of the temperature control, it is furthermore known that with soldering devices, arranging a temperature sensor which is separate from the heat coil and has the smallest possible dimensions inside the soldering tip is beneficial, as far as possible towards the active end of this soldering tip. Since in this case, the temperature sensor is connected with the heat coil in a heat-conducting manner only via the soldering tip, there exists, during a change of the soldering tip without prior turning off of the soldering device, the danger of overheating and a burnout of the heat coil since the temperature sensor then indicates a temperature which lies considerably below the actual temperature of the heat coil and leads to an increase of the heating current.

Furthermore, in the case of a very strong heat output at the soldering tip, during soldering of large-surface components with a high heat capacity, there arises the problem that, during the soldering process, the heat coil is brought to a relatively high temperature in order to deliver the required heat output to the soldering spot. When the soldering tip is then moved away from the soldering spot, the high heat energy still stored in the heat coil leads to an overheating of the soldering tip with all sorts of disadvantageous consequences, such as overheating of the solder located thereon or the oxidation of the soldering tip itself.

SUMMARY OF THE INVENTION

It is the task of the invention to create a temperature control device of the initially described type which permits an improved control of the temperature at the object to be heated, such as the soldering spot, without the danger of damage to the heating device itself.

Due to the arrangement of the temperature control device in accordance with the invention, a very precise control of the operating temperature, for example at the soldering spot, is achieved, i.e., independent of whether the heat output transmission device is formed by a soldering tip or by a hot gas flow, since the temperature sensor which is as near the soldering spot as possible, produces a precise control of the temperature, while the control circuit operating in a manner dependent on the temperature of the heat coil, attempts to maintain these heat coils at all times at as high a temperature as possible, particularly when the control value of the control circuit evaluating the temperature of the heat coil is set higher than the control value of the control circuit which is controlled by the temperature sensor.

The measurement of the temperature of the heat coils may then preferably take place in the initially described manner by measuring the temperature-dependent resistance of these heat coils.

However, it is also possible to arrange a separate measuring sensor in the area of the heat coils.

In the case of a heat output transmission device in the form of a gas flow, during interruption of the gas flow, the temperature sensor is no longer charged with a hot gas flow, so that it cools off and the additional control circuit constantly delivers control signals to the AND logic circuit. The control signals of the one control circuit evaluating the temperature of the heat coils are produced only when the heat coil falls below the temperature predetermined by a control value. Due to the AND-connection of the control signals of both control circuits with each other, a turn-on output signal is directed to the heating current source only when the temperature of the heat coils as well as the temperature of the temperature sensor drop below the respective control values. When the gas supply is again reintroduced, the heat coil is cooled so that the one accompanying control circuit constantly delivers control signals while the additional control circuit which is assigned to the temperature sensor, delivers control signals dependent on the exit temperature of the hot gas in the area of the nozzle which in turn are subjected to the AND logic circuit with the control signals of the one control circuit. Since the one desired value preferably corresponds to a higher temperature than the additional desired value, wherein this higher temperature may be equal to the maximum temperature admissible for the heat coils, the heat coil is always maintained at a sufficient temperature and it is simultaneously protected against burnout.

The same is applicable to the case wherein the heat output transmission device is formed by a soldering tip, since the control circuit evaluating the temperature of the heat coil also attempts to maintain this heat coil at as high a temperature as possible here, while, on the other hand, the control circuit assigned to the temperature sensor limits the heat output directed to the heat coil to such an extent that the temperature at the end of the heat output transmission device, i.e. at the active end of the soldering tip to be brought into contact with the soldering spot, is maintained at a constant value. When a large amount of heat is removed from the active end of the soldering tip, for example through a soldering spot with high heat capacity, then the control signal of the additional control device assigned to the temperature sensor is produced constantly and the heat coil is provided with a very high heat output, which, even during a high thermal resistance of the heating tip, for example, due to its form or material, leads to an increased heat flow and thus towards maintaining the desired temperature of the active end of the soldering tip.

In order to eliminate the problem of the soldering tip overheating after the soldering of structural elements of high heat capacity, additionally, in accordance with a preferred arrangement of the invention, a coupling in of at least one portion of the output signal of the temperature sensor assigned to the heat coil is provided in the comparator, which compares the output signal of the measuring sensor assigned to the soldering tip with the control value. In the case of a particularly large heat loss at the soldering tip which, due to the control and the thermal resistance between the heat coil and the soldering tip, leads to a relatively large temperature difference between the heat coil and the soldering tip, this coupling causes the soldering tip temperature to drop slightly below the control temperature. During the subsequent relieving of the soldering tip by the removing it from the soldering spot, however, a very large increase of the temperature of the soldering tip beyond the control temperature is prevented due to the heat energy stored in the heat coil.

This coupling of the output signal of the temperature sensor assigned to the heat coil into the comparator for the output signal of the temperature sensor assigned to the soldering tip can be set to an order of magnitude of 10% of the influence of the temperature sensor assigned to the soldering tip.

Preferably, this coupling is carried out furthermore in such a way that during the idle state no coupling occurs whatsoever and this coupling increases with increasing heat loss at the soldering tip up to a predetermined maximum value.

BRIEF DESCRIPTION OF THE DRAWINGS

Examples of the invention are explained in greater detail in the following text by means of the drawings.

In the drawings.

DETAILED DESCRIPTION OF THE PREFERRED EMBODIMENT

Figure 1:
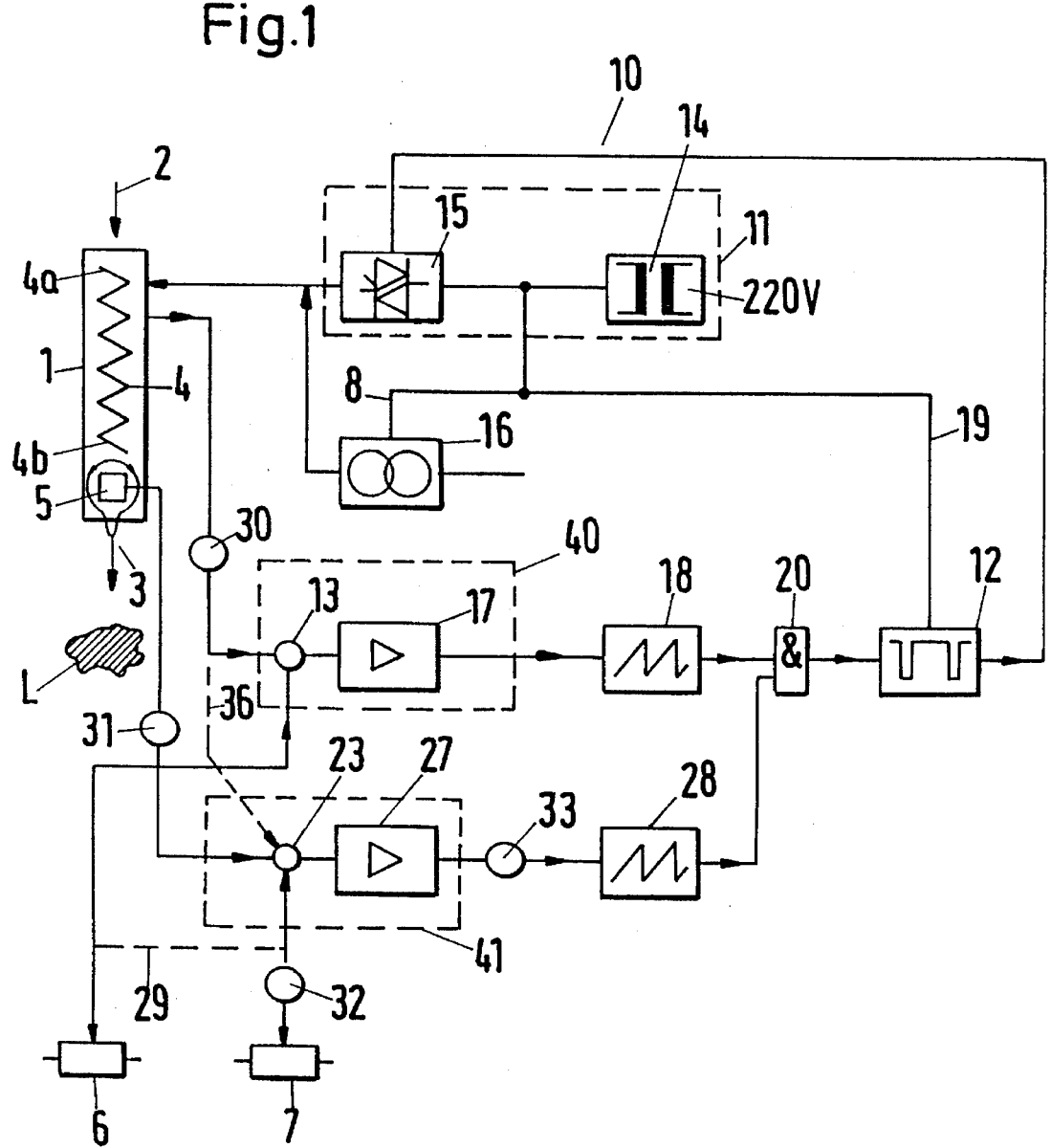
FIG. 1 shows a schematic block diagram of an arrangement of the temperature control device.

In FIG. 1, an arrangement of the temperature controling device for a soldering or unsoldering device is shown schematically which, in the example shown here is in the form of a hotgas soldering or unsoldering device. This hot gas soldering or unsoldering device has a heating arrangement (1) in simplified form which includes a heat coil (4), to the inlet end (4a) of which a gas, such as air, is introduced in the direction of the arrow (2). This gas forms a heat output transmission device (3) from the heat coil to a soldering spot shown at (L), since during passage through the heat coil (4) it is heating from its inlet end (4a) to the outlet end (4b) and its heat is surrendered to the soldering spot (L). A temperature sensor (5), arranged along the heat output transmission path as close as possible to the soldering spot (L), is charged with this hot gas.

In the same way, this heating arrangement (1) could also be formed by means of a heat coil and a soldering or unsoldering tip, connected therewith in a heat-conducting manner, forming the heat output transmission device.

The heat coil (4) is fed from a heating current source (11) which, for example, may include a semiconductor (15) the conductivity of which can be controlled and a voltage source in the form of a mains transformer (14), wherein the semiconductor (15), controllable with respect to its conductivity, is controlled via a line (10) by a synchronization circuit (12) which will be explained in greater detail. During periodic interruptions of the heating current through the heat coil (4), the same is provided with a measuring current from a measuring current source (16) and the voltage drop along the heat coil is compared in a comparator (13) of a comparator circuit (40) with a control value by means of a value setting device (6). Since the heat coil has, for example, a positive resistance temperature coefficient of sufficient magnitude, the voltage drop along the heat coil (4) represents a measurement of its temperature.

If desired, the measurement of the temperature of the heat coil may also be carried out with a separate measuring sensor, the output signal of which is directed to the comparator (13).

The comparator circuit (40) may possibly also include an amplifier (17) which directs the output signal of the comparator (13) after amplification to a pulse width modulator (18) which delivers control signals for a duration which depends on the output signal of the comparator (13).

The output signal of the temperature sensor (5), in a second comparator circuit (41) with a second comparator (23), is compared with a second control value of a value setting device (7) and also possibly after amplification in an amplifier (27) is directed to a second pulse width modulator (28) which delivers control signals for a duration which depends on the output signal of the second comparator (23).

The output signals of the first and second pulse width modulators (18, 28) are directed to the first or second inlet of an AND logic element (20), which directs turn-on output signals to the already mentioned synchronization circuit (12) which provides turn-on pulses for the controllable semiconductor (15). This synchronization circuit (12) is fed via a line (19) with a synchronization signal which is furthermore directed via a line (8) to the measuring current source (16) in order to alternately turn on the controllable semiconductor (15) of the heating current source (11) or the measuring current source (16).

When no gas is directed to the heat coils (4), then the temperature sensor (5) is not heated and the accompanying control circuit from the comparator (23), the amplifier (27) and the pulse width modulator (28) constantly deliver control signals to the connection member (20). In this manner, the voltage drop along the heat coil (4) and thus its temperature determine the supply of turn-on signals to the synchronization circuit (12) so that the heat coil (4) can always be maintained at operating temperature and can simultaneously be protected against burnout.

The control value of the value setting device (6) for the control circuit (13,17,18) assigned to the heat coil (4) is preferably set at a higher temperature than the control circuit assigned to the temperature sensor (5) and it can be set to the maximum admissible temperature of the heat coil (4).

The value setting devices (6 and 7) may be coupled with each other and may keep track of each other as indicated by the dotted line (29) in FIG. 1.

Then, if gas passes through the heat coil (4), the temperature sensor (5) is heated and, upon reaching the desired temperature, the delivery of control signals is interrupted by the second control circuit (23,27,28), so that the heating current is also interrupted and the heat coil (4) cools off until the desired temperature at the temperature sensor (5) is again reached and falls short.

For this reason, during the supply of the gas, the control circuit (13,17,18) assigned to the heat coil (4), constantly delivers control signals and the temperature of the heating gas is merely influenced by the control circuit (23,27,28) assigned to the temperature sensor (5).

In an analogous manner, during use of a soldering tip as a heat output transmission device, the one control circuit (13,17,18) assigned to the heat coil would also strive to maintain the temperature of the heat coil at as high a value as possible so that sufficient heat can be delivered to the soldering tip when needed and the additional control circuit, which is assigned to the temperature sensor which is as near the active end of the soldering tip as possible, would take over the precise control of the temperature of this active end.

Figure 2:
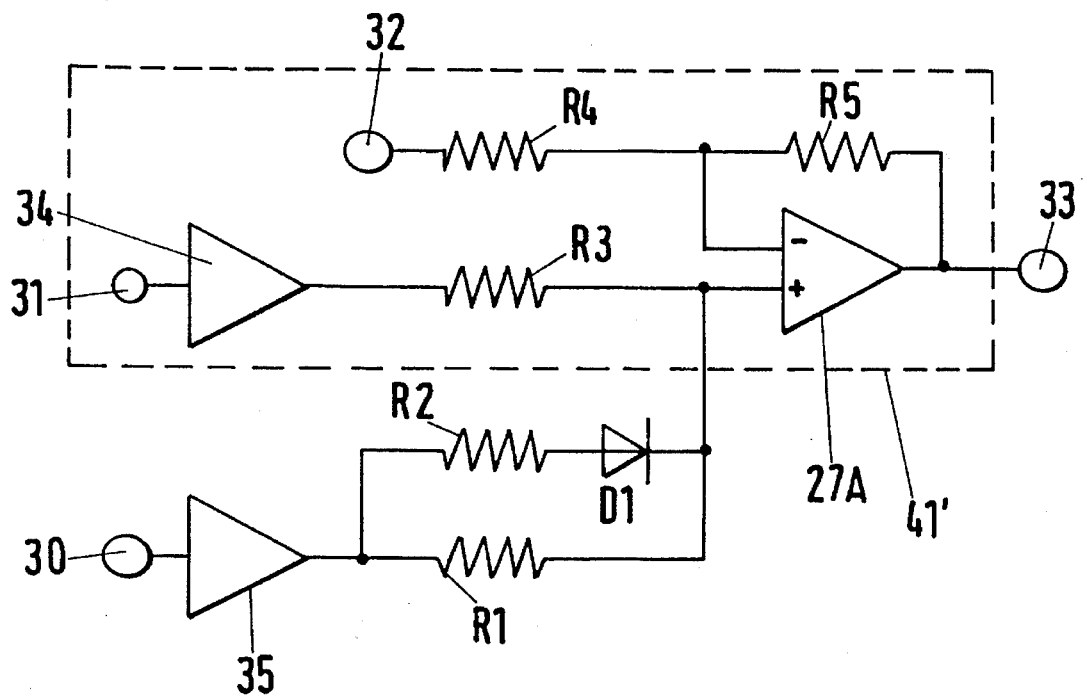
FIG. 2 shows a variation of the comparator circuit (41) according to FIG. 1.

In FIG. 2, an altered arrangement of the comparator circuit (41) is shown, wherein the connection points of this comparator circuit according to FIG. 1 are indicated (30,31, 32,33) placed in circles. As is already indicated in FIG. 1 by the dotted line (36), at the comparator circuit (41'), in accordance with FIG. 2, a coupling of a portion of the output signal of the temperature sensor assigned to the heat coil (4) (the heat coil itself may be this temperature sensor) into the comparator (23) of the second comparator circuit takes place.

As can be seen from FIG. 2, the comparator circuit (41') has an amplifier (34) for the output signal of the temperature sensor (5) which is present at (31) and the output signal of the amplifier (34) is directed via resistance (R3) to the noninverting input of an operational amplifier (27A) which simultaneously forms the amplifier (27) of the comparator circuit (41) in accordance with FIG. 1. This operations amplifier (27A) is provided in a typical manner with a reverse feedback resistance (R5) from the output to the inverting input and to this inverting input—via a resistance (R4), the signal is directed from the value setting device (7) at the connection point (32).

The output signal of the operational amplifier (27A) is directed via the connection point described with (33) to the input of the pulse width modulator (28) which operates with negative logic, i.e. is turned on during a negative output signal of the comparator circuit (41 or 41') in order to deliver turn-on signals for the current supply of the heat coil (4).

From the connection point (30), the temperature signal assigned to the heat coil (4) is directed via an amplifier (35) and a resistance (R1) to the noninverting input of the operational amplifier (27A), wherein this resistance (R1) is bridged by a parallel switching arrangement of an additional resistance (R2) and a diode (D1). The magnitude of the coupling of the temperature signal of the heat coil (4), with respect to the temperature output signal of the measuring sensor (5), is determined by the relationship of the resistances (R1 or R2/D1) to the resistance (R3) and is fixed, for example, at approximately 10% of the influence of the temperature sensor (5).

The amplification of the temperature sensor signals present at the connection points (31 and 30) in the amplifiers (34 and 35) is selected in such a way, that in the idle state the two temperatures which are different from each other produce the same output signal, thus no control influence is present. During a great load, i.e., heat loss at the soldering tip, the temperature of the heat coil (4) strongly increases and influences the signal directed to the noninverting input of the operational amplifier (27A) at first only via (R1) and during an increasing deviation, via the parallel switching arrangement of (R1), on the one hand, and the series connection of (R2 and D1), on the other hand. The temperature signal of the heat coil (4) is then added to the output signal of the temperature sensor (5) assigned to the soldering tip. This does indeed result in a reduction in the desired temperature of the soldering tip, however, on the other hand, the soldering tip is not being charged, too high a temperature increase at the soldering tip is prevented due to the heat energy stored in the heat coil.

Since the temperature of the heat coil precedes the temperature of the soldering tip, this arrangement results practically in a PD-control device.

What is claimed is:

1. A temperature control device for soldering equipment, comprising:

a controllable heating current source generating a heating current when said controllable heating current source is turned on;

a heating arrangement receiving said heating current and having a heat output transmission device for transmitting heat to a soldering spot;

a first sensor adjacent to said heating arrangement, said first sensor measuring the temperature at a point along said heating arrangement and producing a first sensor signal indicative of the measured temperature at said point along said heating arrangement;

a second sensor adjacent to said heat output transmission device, said second sensor measuring the temperature of said heat output transmission device and producing a second sensor signal indicative of the measured temperature of said heat output transmission device;

a first control circuit receiving said first sensor signal and producing a first control signal by comparing said first sensor signal with a first desired temperature value for said heating arrangement;

a second control circuit receiving said second sensor signal and producing a second control signal by comparing said second sensor signal with a second desired temperature value for said heat output transmission device; and a third circuit receiving said first and second control signals and producing an output signal that is received by said controllable heating current source, said output signal turning on said heating current source when said first control signal indicates that the measured temperature of said heating arrangement is less than said first desired temperature value and said second control signal indicates that the measured temperature of said heat output transmission device is less than said second desired temperature value.

2. A temperature control device as in claim 1, further comprising a measuring current source for producing a measuring current when said controllable heating current source is turned off.

3. A temperature control device as in claim 1, wherein said first control circuit comprises:
   a comparator for comparing said first sensor signal with said first desired temperature value and producing a comparator output signal;
   an amplifier receiving said comparator output signal and producing an amplifier output signal; and
   a pulse width modulator receiving said amplifier output signal and producing pulses with a pulse width dependent on said comparator output signal.

4. A temperature control device as in claim 1, wherein said second control circuit comprises:
   a comparator for comparing said second sensor signal with said second desired temperature value and producing a comparator output signal;
   an amplifier receiving said comparator output signal and producing an amplifier output signal; and
   a pulse width modulator receiving said amplifier output signal and producing pulses with a pulse width dependent on said comparator output signal.

5. A temperature control device as in claim 1, wherein said third circuit comprises an AND gate.

6. A temperature control device as in claim 1, wherein said heat output transmission device is formed by a hot gas flow and said heating arrangement includes a heat coil with a gas flow inlet and a gas flow outlet that is adjacent to said heat output transmission device.

7. A temperature control device as in claim 1, wherein said heat output transmission device is formed by a soldering tip with a first end contacting said soldering spot, said second sensor being adjacent to said first end of said soldering tip.

8. A temperature control device as in claim 2, further comprising a fourth circuit receiving said output signal of said third circuit and producing a synchronization signal to control said controllable heating current source and said measuring current source.

9. A temperature control device as in claim 1, wherein said first desired temperature value corresponds to a temperature equal to a maximum admissible temperature of said heating arrangement.

10. A temperature control device as in claim 1, wherein said first desired temperature value is greater than said second desired temperature value.

11. A temperature control device as in claim 1, wherein said first and second desired temperature values are mutually tracked.

12. A temperature control device as in claim 1, wherein said controllable heating current source comprises a transformer and a semiconductor switch.

13. A temperature control device for soldering equipment, comprising:
   a controllable heating current source generating a heating current when said controllable heating current source is turned on;
   a heating arrangement receiving said heating current and having a heat output transmission device for transmitting heat to a soldering spot;
   a first sensor adjacent to said heating arrangement, said first sensor measuring the temperature at a point along said heating arrangement and producing a first sensor signal indicative of the measured temperature at said point along said heating arrangement;
   a second sensor adjacent to said heat output transmission device, said second sensor measuring the temperature of said heat output transmission device and producing a second sensor signal indicative of the measured temperature of said heat output transmission device;
   a first control circuit receiving said first sensor signal and producing a first control signal by comparing said first sensor signal with a first desired temperature value for said heating arrangement;
   a second control circuit receiving as input signals said first sensor signal, said second sensor signal, and a second desired temperature value for said heat output transmission device;
   said second control circuit adding said first sensor signal and said second sensor signal to produce a combined signal, and wherein said second control circuit produces a second control signal by comparing said combined signal with said second desired temperature value; and
   a third circuit receiving said first and second control signals and producing an output signal that is received by said controllable heating current source, said output signal controlling said heating current source.

14. A temperature control device as in claim 13, wherein said first sensor signal is scaled before being added to said second sensor signal.

15. A temperature control device as in claim 14, wherein said output signal turns on said heating current source when said first control signal indicates that the measured temperature of said heating arrangement is less than said first desired temperature value and said second control signal indicates that the sum of said scaled first sensor signal and said second sensor signal is less than said second desired temperature value.

16. A temperature control device as in claim 13, further comprising a measuring current source for producing a measuring current when said controllable heating current source is turned off.

17. A temperature control device as in claim 13, wherein said first control circuit comprises:
   a comparator for comparing said first sensor signal with said first desired temperature value and producing a comparator output signal;
   an amplifier receiving said comparator output signal and producing an amplifier output signal; and
   a pulse width modulator receiving said amplifier output signal and producing pulses with a pulse width dependent on said comparator output signal.

18. A temperature control device as in claim 16, further comprising a fourth circuit receiving said output signal of said third circuit and producing a synchronization signal to control said controllable heating current source and said measuring current source.

19. A temperature control device as in claim 13, wherein said first desired temperature value corresponds to a temperature equal to a maximum admissible temperature of said heating arrangement.

20. A temperature control device as in claim 13, wherein said first desired temperature value is greater than said second desired temperature value.

21. A temperature control device as in claim 13, wherein said second control circuit comprises amplifiers for amplifying said second sensor signal and said first sensor signal.

22. A temperature control device as in claim 14, wherein said scaled first sensor signal represents approximately ten percent of the influence of said second sensor signal.

23. A temperature control device for soldering equipment, comprising:
- a controllable heating current source generating a heating current when said controllable heating current source is turned on;
- a heating arrangement receiving said heating current and having a heat output transmission device for transmitting heat to a soldering spot;
- a first sensor adjacent to said heating arrangement, said first sensor measuring the temperature at a point along said heating arrangement and producing a first sensor signal indicative of the measured temperature at said point along said heating arrangement;
- a second sensor adjacent to said heat output transmission device, said second sensor measuring the temperature of said heat output transmission device and producing a second sensor signal indicative of the measured temperature of said heat output transmission device;
- a control circuit receiving said first sensor signal and said second sensor signal and producing an output signal that is received by said controllable heating current source; and
- said output signal mining on said heating current source when the measured temperature of said heating arrangement is less than a first desired temperature value for said heating arrangement and the measured temperature of said heat output transmission device is less than a second desired temperature value for said heat output transmission device.

24. A temperature control device as in claim 23, further comprising a measuring current source for producing a measuring current when said controllable heating current source is turned off.

25. A temperature control device as in claim 23, wherein said control circuit includes a first circuit, a second circuit, and third circuit.

26. A temperature control device as in claim 25, wherein said first circuit receives said first sensor signal and produces a first control signal by comparing said first sensor signal with said first desired temperature value.

27. A temperature control device as in claim 26, wherein said second circuit receives said second sensor signal and produces a second control signal by comparing said second sensor signal with said second desired temperature value.

28. A temperature control device as in claim 27 wherein said third circuit receives said first and second control signals and produces said output signal.

29. A temperature control device as in claim 26, wherein said first circuit comprises:
- a comparator for comparing said first sensor signal with said first desired temperature value and producing a comparator output signal;
- an amplifier receiving said comparator output signal and producing an amplifier output signal; and
- a pulse width modulator receiving said amplifier output signal and producing pulses with a pulse width dependent on said comparator output signal.

30. A temperature control device as in claim 27 wherein said second circuit comprises:
- a comparator for comparing said second sensor signal with said second desired temperature value and producing a comparator output signal;
- an amplifier receiving said comparator output signal and producing an amplifier output signal; and
- a pulse width modulator receiving said amplifier output signal and producing pulses with a pulse width dependent on said comparator output signal.

31. A temperature control device as in claim 28, wherein said third circuit comprises an AND gate.

32. A temperature control device as in claim 24, further comprising a synchronization circuit receiving said output signal of said control circuit and producing a synchronization signal to control said controllable heating current source and said measuring current source.

33. A temperature control device as in claim 23, wherein said first desired temperature value corresponds to a temperature equal to a maximum admissible temperature of said heating arrangement.

34. A temperature control device as in claim 23, wherein said first desired temperature value is greater than said second desired temperature value.

* * * * *